(12) United States Patent
Lin et al.

(10) Patent No.: US 8,509,798 B2
(45) Date of Patent: Aug. 13, 2013

(54) COOPERATIVE APPARATUS AND RESOURCE BLOCK ALLOCATION METHOD THEREOF FOR USE IN WIRELESS NETWORK

(75) Inventors: Hsuan-Li Lin, Taipei (TW); Yu-Shen Chou, Taipei (TW); Shu-Tsz Liu, Taipei (TW); Kanchei Loa, Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 13/290,573

(22) Filed: Nov. 7, 2011

(65) Prior Publication Data

US 2012/0115499 A1      May 10, 2012

Related U.S. Application Data

(60) Provisional application No. 61/411,481, filed on Nov. 9, 2010.

(51) Int. Cl.
*H04W 72/00*      (2009.01)

(52) U.S. Cl.
USPC ............ 455/452.1; 455/450; 455/422.1; 455/446; 455/522

(58) Field of Classification Search
USPC ............ 455/452.1, 450, 422.1, 446, 522
See application file for complete search history.

(56) References Cited

U.S. PATENT DOCUMENTS

| | | | |
|---|---|---|---|
| 2007/0087772 A1* | 4/2007 | Yi et al. | 455/522 |
| 2010/0111021 A1 | 5/2010 | Hui | |
| 2011/0105138 A1* | 5/2011 | Morimoto et al. | 455/452.2 |

OTHER PUBLICATIONS

Extended European Search Report for European counterpart application 11188145.4 to the present applicaiton, Feb. 17, 2012, 9 pages.
Ashraf I et al "Distributed Radio Coverage Optimization in Enterprise Fetocell Networks", IEEE conference in NJ, USA, May 23, 2010; 6 pages.
Heui-Chang Lee et al "Mitigation of Inter-Femtocell Interference with Adaptive Fractional Frequency Reuse", IEEE conference in NJ, USA, May 23, 2010; 6 pages.

\* cited by examiner

*Primary Examiner* — Nghi H Ly
(74) *Attorney, Agent, or Firm* — Skaar Ulbrich Macari, P.A.

(57) ABSTRACT

A cooperative apparatus and a resource block allocation method thereof for use in a wireless network are provided. The wireless network comprises a plurality of femtocells. The cooperative apparatus groups the femtocells based on signal interferences between the femtocells. The femtocells with higher signal interferences are joined to the same femtocell group. The cooperative apparatus averagely allocates resource blocks to the femtocells in the same femtocell group, and randomly allocates resource blocks to different femtocell groups.

14 Claims, 13 Drawing Sheets

|   | a | b | c | d | e | f |
|---|---|---|---|---|---|---|
| a |   | -29 | -28 | -35 | -34 | -34 |
| b | -28 |   | -29 | -35 | -36 | -33 |
| c | -26 | -26 |   |   | -35 | -33 |
| d | -34 | -35 | -34 |   | -28 | -29 |
| e | -35 | -34 | -33 | -27 |   | -26 |
| f | -34 | -35 | -33 | -27 | -29 |   |

Enabling the cooperative apparatus to receive the first signal interference value and the second signal interference value from the first femtocell and the second femtocell respectively  901

Enabling the cooperative apparatus to determine that one of the first signal interference value and the second signal interference value exceeds a signal interference threshold  902

Enabling the cooperative apparatus to assign the first femtocell and the second femtocell into a first femtocell group  903

Enabling the cooperative apparatus to receive the third signal interference values and the fourth signal interference values from the third femtocell and the femtocells of the first femtocell group respectively  904

Enabling the cooperative apparatus to determine that none of the third signal interference values and the fourth signal interference values exceeds the signal interference threshold  905

Enabling the cooperative apparatus to assign the third femtocell into a second femtocell group  906

Enabling the cooperative apparatus to randomly allocate a first resource block and a second resource block to the first femtocell group and the second femtocell group respectively  907

Enabling the cooperative apparatus to averagely allocate the first resource block to the femtocells of the first femtocell group and averagely allocate the second resource block to femtocells of the second femtocell group  908

FIG. 9

COOPERATIVE APPARATUS AND RESOURCE BLOCK ALLOCATION METHOD THEREOF FOR USE IN WIRELESS NETWORK

PRIORITY

This application claims the benefit of priority based on U.S. Provisional Application Ser. No. 61/411,481 filed on Nov. 9, 2010, which is hereby incorporated by reference in its entirety.

FIELD

The present invention relates to a cooperative apparatus and a resource block allocation method thereof; and more particularly, the cooperative apparatus and the resource block allocation method thereof according to the present invention allocate resource blocks through grouping of femtocells.

BACKGROUND

In wireless network communications, the network environment is an important factor that determines the communication quality. In order to ensure the communication quality in different network environments, various base stations (BSs) have been developed. Specifically, the communication quality of wireless networks is often restricted by environmental factors (e.g., being blocked by buildings or due to indoor network environments); therefore, in addition to the costly macrocells, low-cost base stations with a small output power and a low processing capability have also been developed to extend application environments of wireless networks. Through wide deployment of such low-cost base stations, the influence of environmental factors on communication quality of wireless networks can be effectively avoided. Among these low-cost base stations, femtocells have become a focus of development at present.

Further speaking, a lot of femtocells may be deployed in a wireless network to reduce the influence of environmental factors on communication quality of the wireless network, and in this case, macrocells connected to the femtocells are used for allocation of network resource blocks. However, if a macrocell fails to allocate network resource blocks to femtocells in an efficient way when a lot of femtocells exist in a network environment simultaneously, then it is likely that signals transmitted by the femtocells will collide with each other to cause interferences. In view of this, many approaches have been proposed to reduce interferences of femtocells.

In the prior art, one of the approaches to avoid interferences between femtocells is to exchange respective network resource usage statuses between femtocells. In detail, femtocells in a network can learn each other's resource block usage statuses through exchanging information with each other. In this way, use of resource blocks can be coordinated among the femtocells to reduce interferences caused by signal collisions. However, when this approach of exchanging information between femtocells is used to reduce the interferences, each femtocell must receive and process information transmitted from other femtocells; and consequently, the femtocells having only a limited computational capability have to consume a high percentage of computational resources in coordinating the allocation of resource blocks.

Accordingly, an approach of randomly allocating resource blocks has also been proposed to avoid consumption of a high percentage of femtocells' computational resources in coordinating the allocation of resource blocks. In detail, in this approach, resource blocks are randomly allocated by a macrocell to individual femtocells; and because this makes it unnecessary for the femtocells to exchange information therebetween, the computational burden on the femtocells is greatly eased. However, although allocating resource blocks randomly can ease the computational burden on the femtocells, the results of random allocation may cause instability of signal collision rates between the femtocells.

Therefore, an urgent need exists in the art to provide a solution that can reduce interferences caused by signal collisions between femtocells in a network environment having a lot of femtocells and can keep the computational burden on the femtocells at a reasonable level so that network resources can be used more efficiently.

SUMMARY

To solve the aforesaid problems, the present invention includes a cooperative apparatus and a resource block allocation method thereof, which allocate resource blocks through grouping of femtocells.

To achieve the aforesaid objective, certain embodiments of the present invention include a resource block allocation method for a cooperative apparatus. The cooperative apparatus is used in a wireless network, and the wireless network comprises a plurality of femtocells including a first femtocell and a second femtocell. The first femtocell records a first signal interference value between the first femtocell and the second femtocell according to a reference signal received power transmitted by the second femtocell. The second femtocell records a second signal interference value between the second femtocell and the first femtocell according to a reference signal received power transmitted by the first femtocell. The resource block allocation method comprises the following steps of: (a) enabling the cooperative apparatus to receive the first signal interference value and the second signal interference value from the first femtocell and the second femtocell respectively; (b) enabling the cooperative apparatus to determine that one of the first signal interference value and the second signal interference value exceeds a signal interference threshold; (c) enabling the cooperative apparatus to assign the first femtocell and the second femtocell into a first femtocell group according to a result of the step (b); and (d) enabling the cooperative apparatus to allocate a first resource block to femtocells of the first femtocell group averagely.

To achieve the aforesaid objective, certain embodiments of the present invention also include a cooperative apparatus for use in a wireless network. The wireless network comprises a plurality of femtocells including a first femtocell and a second femtocell. The first femtocell records a first signal interference value between the first femtocell and the second femtocell according to a reference signal received power transmitted by the second femtocell. The second femtocell records a second signal interference value between the second femtocell and the first femtocell according to a reference signal received power transmitted by the first femtocell. The cooperative apparatus comprises a memory, a transceiver and a processor. The transceiver is configured to receive the first signal interference value and the second signal interference value from the first femtocell and the second femtocell respectively. The memory is configured to store the first signal interference value and the second signal interference value. The processor is configured to determine that one of the first signal interference value and the second signal interference value exceeds the signal interference threshold and to assign the first femtocell and the second femtocell into a first femtocell group. The processor is further configured to averagely allocate a first resource block to femtocells of the first femtocell group.

To achieve the aforesaid objective, certain embodiments of the present invention further include a resource block allocation method for a cooperative apparatus. The cooperative apparatus is used in a wireless network, and the wireless network comprises a plurality of femtocells including a first femtocell and a second femtocell. The resource block allocation method comprises the following steps of: (a) enabling the cooperative apparatus to receive a first femtocell global positioning system (GPS) coordinate and a second femtocell GPS coordinate from the first femtocell and the second femtocell respectively; (b) enabling the cooperative apparatus to estimate a first signal interference value between the first femtocell and the second femtocell according to the first femtocell GPS coordinate and the second femtocell GPS coordinate; (c) enabling the cooperative apparatus to determine that the first signal interference value exceeds a signal interference threshold; (d) enabling the cooperative apparatus to assign the first femtocell and the second femtocell into a first femtocell group according to a result of the step (c); and (e) enabling the cooperative apparatus to averagely allocate a first resource block to femtocells of the first femtocell group.

To achieve the aforesaid objective, certain embodiments of the present invention further include a cooperative apparatus for use in a wireless network. The wireless network comprises a plurality of femtocells including a first femtocell and a second femtocell. The cooperative apparatus comprises a memory, a transceiver and a processor. The transceiver is configured to receive a first femtocell GPS coordinate and a second femtocell GPS coordinate from the first femtocell and the second femtocell respectively. The memory is configured to store the first femtocell GPS coordinate and the second femtocell GPS coordinate. The processor is configured to estimate a first signal interference value between the first femtocell and the second femtocell according to the first femtocell GPS coordinate and the second femtocell GPS coordinate and to determine that the first signal interference value exceeds the signal interference threshold. The processor is further configured to assign the first femtocell and the second femtocell into a first femtocell group and to averagely allocate a first resource block to femtocells of the first femtocell group.

According to the aforesaid descriptions, the cooperative apparatus and the resource block allocation method of certain embodiments of the present invention can group femtocells which highly interfere with each other into a same group and then averagely allocate a resource block to the femtocells in the same group. This can reduce interferences in the network as a whole while still maintaining the computational capability of the femtocells The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 9 is a flowchart diagram of a resource block allocation method according to a ninth embodiment of the present invention;

DETAILED DESCRIPTION

In the following description, the present invention will be explained with reference to example embodiments thereof. However, these example embodiments are not intended to limit the present invention to any specific example, embodiment, environment, applications or particular implementations described in these example embodiments. Therefore, description of these example embodiments is only for purpose of illustration rather than to limit the present invention. It should be appreciated that, in the following embodiments and the attached drawings, elements unrelated to the present invention are omitted from depiction.

Figure 1A:
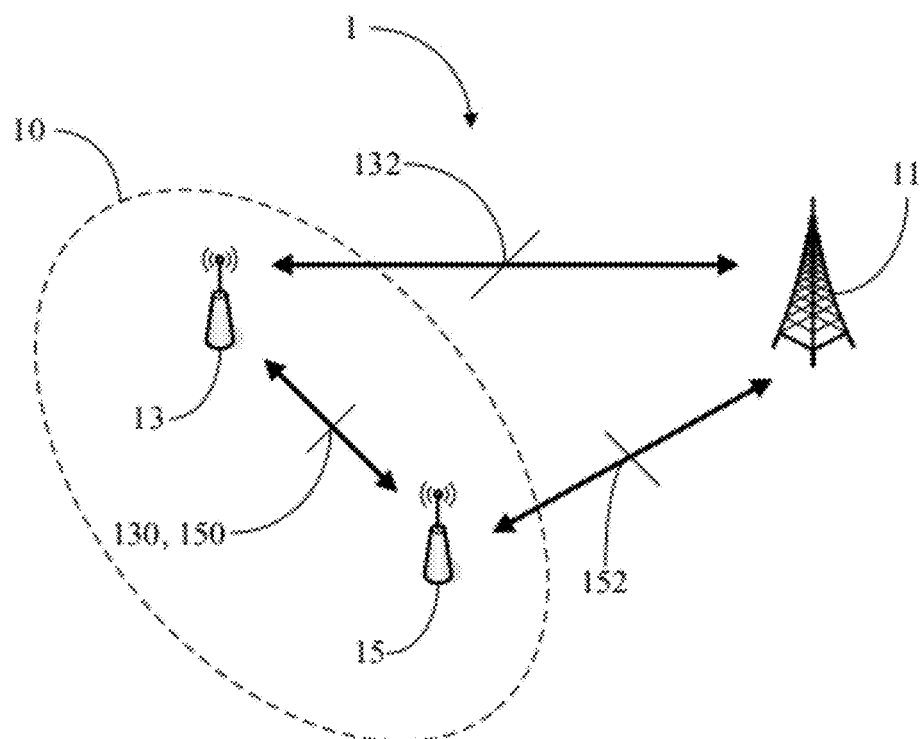
FIG. 1A is a schematic view of a wireless network according to a first embodiment of the present invention.
Figure 1B:
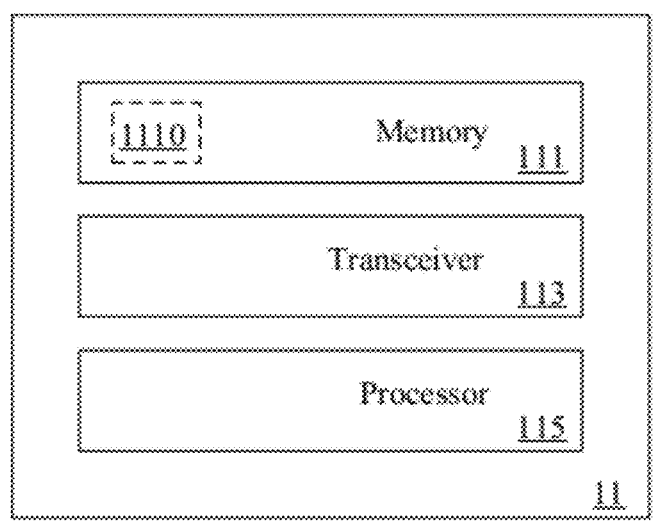
FIG. 1B is a schematic view of a cooperative apparatus according to the first embodiment of the present invention.

Please refer to FIG. 1A and FIG. 1B together. FIG. 1A is a schematic view of a wireless network 1 according to a first embodiment of the present invention. The wireless network 1 comprises a cooperative apparatus 11 and a plurality of femtocells. It shall be particularly appreciated, only a first femtocell 13 and a second femtocell 15 are illustrated in the first embodiment for purpose of describing the main concepts of the present invention clearly; however, this is not intended to limit the number of femtocells. FIG. 1B is a schematic view of the cooperative apparatus 11 according to the first embodiment of the present invention. The cooperative apparatus 11 comprises a memory 111 storing a signal interference threshold 1110, a transceiver 113 and a processor 115. Interactions between the network components will be further described hereinbelow.

Firstly, each of the femtocells must receive reference signal received powers of other femtocells in the wireless network so as to learn the signal interference statuses between the femtocells. Specifically, in the first embodiment, the first femtocell 13 receives a reference signal received power 150 transmitted by the second femtocell 15 and records a first signal interference value 132 between the first femtocell 13 and the second femtocell 15 according to the reference signal received power 150. In a similar way, the second femtocell 15 receives a reference signal received power 130 transmitted by the first femtocell 13 and records a second signal interference value 152 between the second femtocell 15 and the first femtocell 13 according to the reference signal received power 130. Then, the first femtocell 13 and the second femtocell 15 transmit the first signal interference value 132 and the second signal interference value 152 to the cooperative apparatus 11 respectively.

In other words, the transceiver 113 of the cooperative apparatus 11 receives the first signal interference value 132 and the second interference value 152 from the first femtocell 13 and the second femtocell 15 respectively and stores the first signal interference value 132 and the second signal interference value 152 into the memory 111. Then, the processor 115 of the cooperative apparatus 11 determines whether the first signal interference value 132 or the second signal interference value 152 exceeds the signal interference threshold 1110. It shall be particularly appreciated that, the signal interference threshold 1110 is a tolerable signal interference value. In detail, if a signal interference value does not exceed the signal interference threshold 1110, then it means that the signal interference is still within a tolerable range; conversely, if a signal interference value exceeds the signal interference threshold 1110, then it means that the signal interference is serious and must be removed.

Because the interferences between the first femtocell 13 and the second femtocell 15 in two directions are not symmetric with each other, the determination of whether the signal interference between the first femtocell 13 and the second femtocell 15 exceeds the interference threshold 1110 must be made in both directions. Specifically, the processor 115 of the cooperative apparatus 11 determines whether the first signal interference value 132 or the second signal interference value 152 exceeds the signal interference value 1110. If neither of the first signal interference value 132 and the second signal interference value 152 exceeds the signal interference threshold 1110, then it means that the interferences between the first femtocell 13 and the second femtocell 15 are still within a tolerable range. However, the first embodiment focuses on the case where one of the first signal interference value 132 and the second signal interference value 152 exceeds the signal interference threshold 1110; in other words, the first embodiment focuses on the case where excessively high interferences exist between the first femtocell 13 and the second femtocell 15.

Then, because the processor 115 of the cooperative apparatus 11 determines that one of the first signal interference value 132 and the second signal interference value 152 exceeds the signal interference threshold 1110, the processor 115 of the cooperative apparatus 11 assigns the first femtocell 13 and the second femtocell 15 into a first femtocell group 10 according to this result and averagely allocates a first resource block (not shown) to femtocells (i.e., the first femtocell 13 and the second femtocell 15) of the first femtocell group 10. In this way, femtocells which interfere with each other to a great extent in the wireless network are grouped into a same femtocell group, and then the cooperative apparatus 11 can allocate resource blocks to femtocells in units of groups.

Figure 2A:
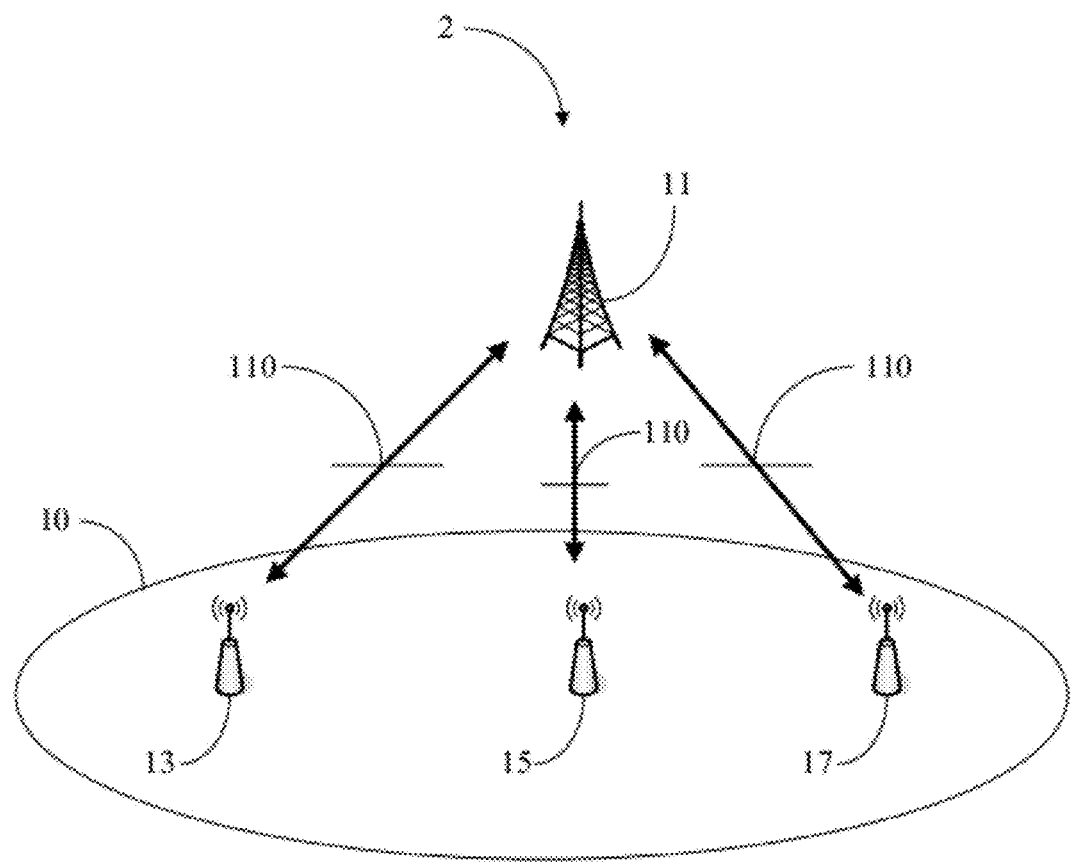
FIG. 2A is a schematic view of a wireless network according to a second embodiment of the present invention.
Figure 2B:
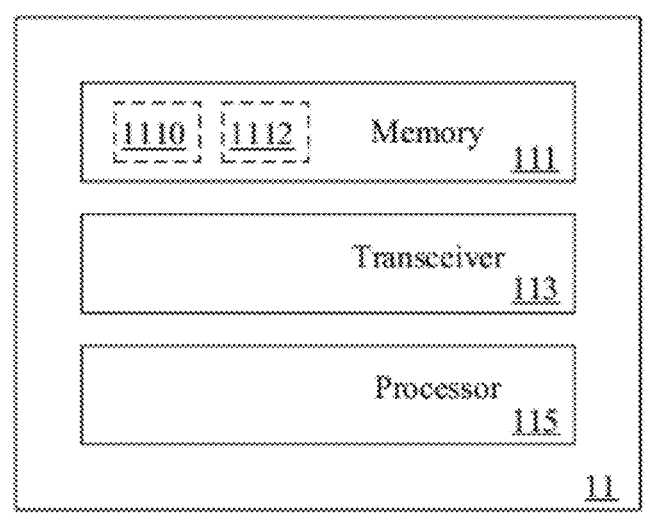
FIG. 2B is a schematic view of a cooperative apparatus according to the second embodiment of the present invention.

According to the grouping concept of the first embodiment, the first femtocell group 10 may comprise a lot of femtocells which highly interfere with each other simultaneously. However, to avoid uneven allocation of resources due to a too large number of femtocells included in a single group, the femtocell group must be appropriately re-adjusted when it comprises too many femtocells. Next, please refer to FIG. 2A and FIG. 2B. FIG. 2A is a schematic view of a wireless network 2 according to a second embodiment of the present invention; and FIG. 2B is a schematic view of a cooperative apparatus 11 according to the second embodiment of the present invention. It shall be particularly appreciated that, the hardware structure and network connection environments of the second embodiment are similar to those of the first embodiment, so no further description will be made thereon again. The second embodiment differs from the first embodiment in that, the first femtocell group 10 in the wireless network 2 of the second embodiment further comprises a third femtocell 17 and the memory 111 of the cooperative apparatus 11 further comprises a group capacity threshold 1112 inputted by an operator.

Specifically, after obtaining the first femtocell group 10 as described in the first embodiment, the processor 115 of the cooperative apparatus 11 may further determine that a number of femtocells in the first femtocell group 10 has exceeded the group capacity threshold 1112. Then, the cooperative apparatus 11 transmits a power decreasing message 110 to the femtocells of the first femtocell group 10 (i.e., the femtocells 13, 15, 17 in the second embodiment) so that the femtocells of the first femtocell group 10 decrease the signal transmission power according to the power decreasing message 110. It shall be particularly appreciated that, by decreasing the signal transmission power of the femtocells, the interferences between some of the femtocells can be reduced to be lower than the signal interference threshold 1110. Thus, the number of femtocells included in the femtocell group can be re-adjusted.

Figure 2C:
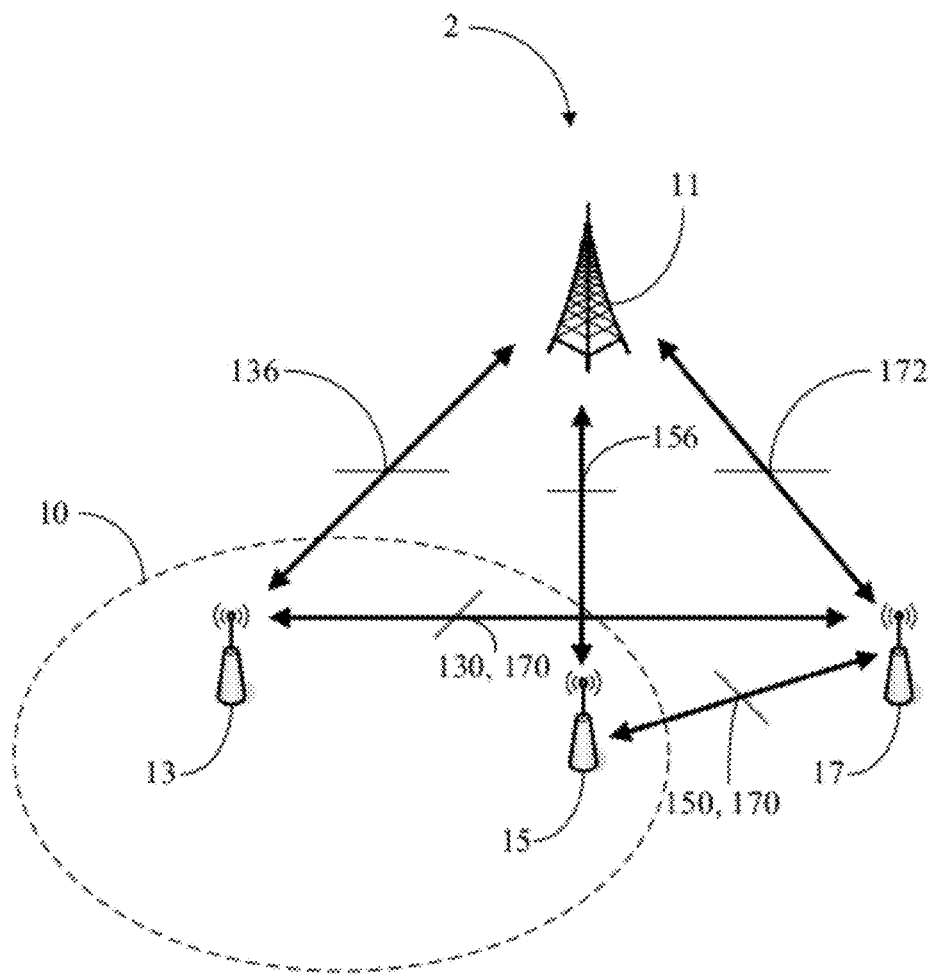
FIG. 2C is another schematic view of the wireless network according to the second embodiment of the present invention.

Referring to FIG. 2C together, there is shown another schematic view of the wireless network 2 according to the second embodiment of the present invention. Further speaking, the third femtocell 17 determines and records a plurality of third signal interference values 172 between the third femtocell 17 and other femtocells of the first femtocell group 10 after receiving the reference signal received powers 130, 150 from the other femtocells (i.e., the first femtocell 13 and the second femtocell 15) of the first femtocell group 10. Similarly, the other femtocells (i.e., the first femtocell 13 and the second femtocell 15) of the first femtocell group 10 also determine and record a plurality of fourth signal interference values 136, 156 between the respective femtocells and the third femtocell 17 after receiving the reference signal received power 170 from the third femtocell 17 respectively.

Next, the transceiver 113 of the cooperative apparatus 11 receives the plurality of third signal interference values 172 from the third femtocell 17 and receives the plurality of fourth signal reference values 136, 156 from the first femtocell 13 and the second femtocell 15, and stores the plurality of third signal interference values 172 and the plurality of fourth signal reference values 136, 156 into the memory 111. Thereafter, the processor 115 of the cooperative apparatus 11 determines that none of the plurality of third signal interference values 172 and the plurality of fourth signal reference values 136, 156 exceeds the signal interference threshold 1110.

In other words, this means that all the bi-directional interferences between the third femtocell 17 and the first and the second femtocells 15, 13 have been reduced to be lower than the signal interference threshold 1110 through the power decreasing process; and further speaking, this means that it is no longer necessary for the third femtocell 17 to stay in the first femtocell group 10. Accordingly, the processor 115 of the cooperative apparatus 11 removes the third femtocell 17 from the first femtocell group 10. It shall be particularly appreciated that, removing the third femtocell 17 from the first femtocell group 10 means that, because the bi-directional interferences between the third femtocell 17 and any other femtocell of the first femtocell group 10 have become lower than the interference threshold, it is unnecessary for the third femtocell 17 to be allocated resources in the first femtocell group 10. However, this is not to remove the third femtocell 17 from the wireless network 2 and, instead, the third femtocell 17 can still be re-grouped into other femtocell groups according to what disclosed in the first embodiment.

Figure 3:
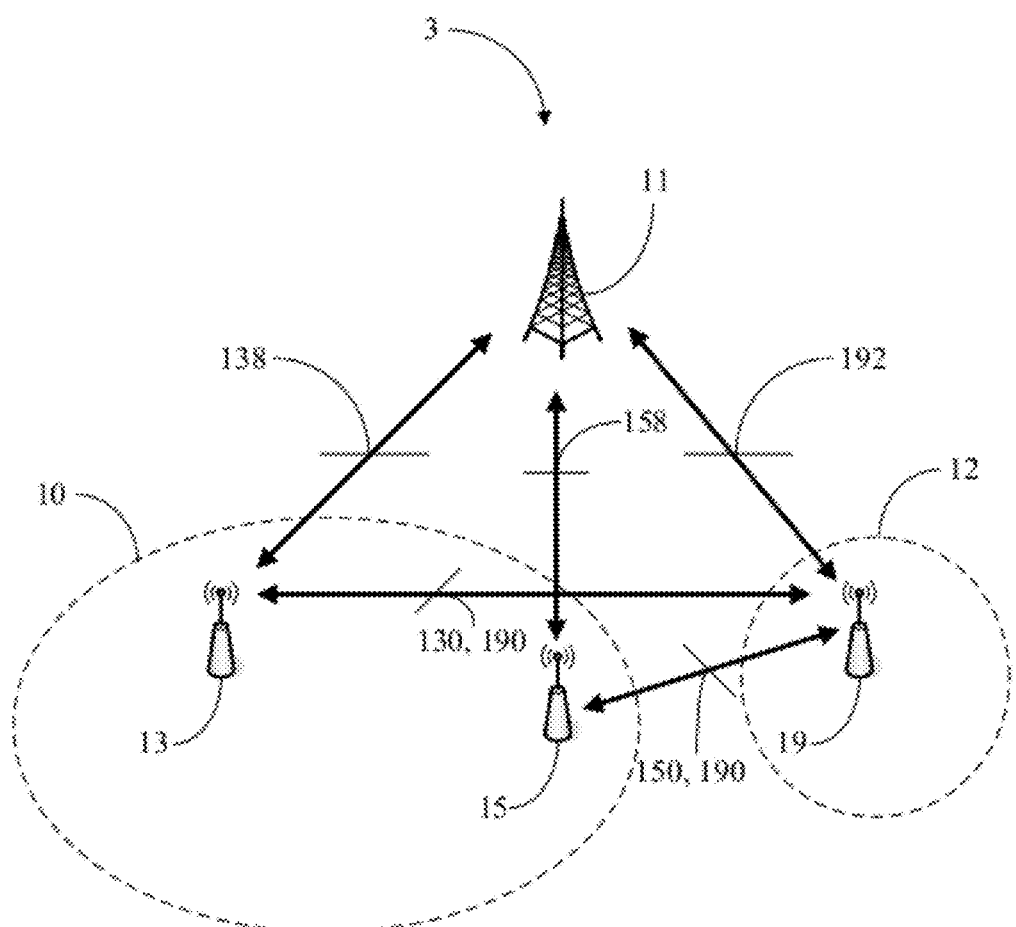
FIG. 3 is a schematic view of a wireless network according to a third embodiment of the present invention.

Similarly, according to the grouping concept of the first embodiment, femtocells in the wireless network may be grouped into different femtocell groups, with femtocells in a same group interfering with each other to a great extent and femtocells in different femtocell groups interfering with each other to a small extent. Referring to FIG. 3, there is shown a schematic view of a wireless network 3 according to a third embodiment of the present invention. It shall be particularly appreciated that, the hardware structure and network connection environments of the third embodiment are similar to those of the first embodiment, so no further description will be made thereon again. The third embodiment differs from the first embodiment in that, the wireless network 3 of the third embodiment further comprises a third femtocell 19.

Similar to the first embodiment, the interference levels between the third femtocell 19 and other femtocells in the wireless network 3 must be firstly determined so as to determine into which group the third femtocell 19 shall be grouped. Specifically, the third femtocell 19 records a plurality of third signal interference values 192 between the third femtocell 19 and femtocells of the first femtocell group 10 according to reference signal received powers 130, 150 transmitted by the femtocells (i.e., the first femtocell 13 and the second femtocell 15) of the first femtocell group 10. Likewise, the femtocells of the first femtocell group 10 record a plurality of fourth signal interference values 138, 158 between the respective femtocells and the third femtocell 19 according to a reference signal received power 190 transmitted by the third femtocell 19. Next, the femtocells of the first femtocell group transmit the plurality of fourth signal interference values 138, 158 to the cooperative apparatus 11, and the third femtocell 19 transmits the plurality of third signal interference values 192 to the cooperative apparatus 11.

In other words, the transceiver 113 of the cooperative apparatus 11 receives the fourth signal interference values 138, 158 from the femtocells of the first femtocell group 10 and the third signal interference values 192 from the third femtocell 19, and stores the third signal interference values 192 and the fourth signal interference values 138, 158 into the memory 111. Then, the processor 115 of the cooperative apparatus 11 determines whether the third signal interference values 192 or the fourth signal interference values 138, 158 exceed the signal interference threshold 1110.

However, the third embodiment focuses on the case where none of the third signal interference values 192 and the fourth signal interference values 138, 158 exceeds the signal interference threshold 1110; in other words, bi-directional signal interferences between the third femtocell 19 and the femtocells of the first femtocell group 10 are all within the tolerable range in the third embodiment. Therefore, the processor 115 of the cooperative apparatus 11 assigns the third femtocell 19 into a second femtocell group 12. Thus, femtocells in a femtocell group interfere with femtocells of other femtocell groups to a small extent, while femtocells in a same group interfere with each other to a great extent.

Then, because femtocells of different femtocell groups interfere with each other to a small extent, resources may be allocated randomly; and because femtocells of a same group interfere with each other to a great extent, resources may be allocated averagely. Specifically, in the third embodiment, the processor 115 of the cooperative apparatus 11 allocates a first resource block and a second resource block to the first femtocell group 10 and the second femtocell group 12 respectively in a random manner. Then, the cooperative apparatus 11 allocates the first resource block to the femtocells of the first femtocell group 10 averagely, and allocates the second resource block to the femtocells of the second femtocell group 12 also averagely. Accordingly, because different groups of femtocells interfere with each other to a small extent, even allocating the resource blocks to different groups of femtocells randomly will not readily cause interference collisions; and because femtocells of a same group interfere with each other to a great extent, allocating a resource block to the femtocells averagely can reduce the possibility of interference collisions. Thereby, the resource blocks can be allocated to the femtocells in the wireless network more efficiently.

Figure 4A:
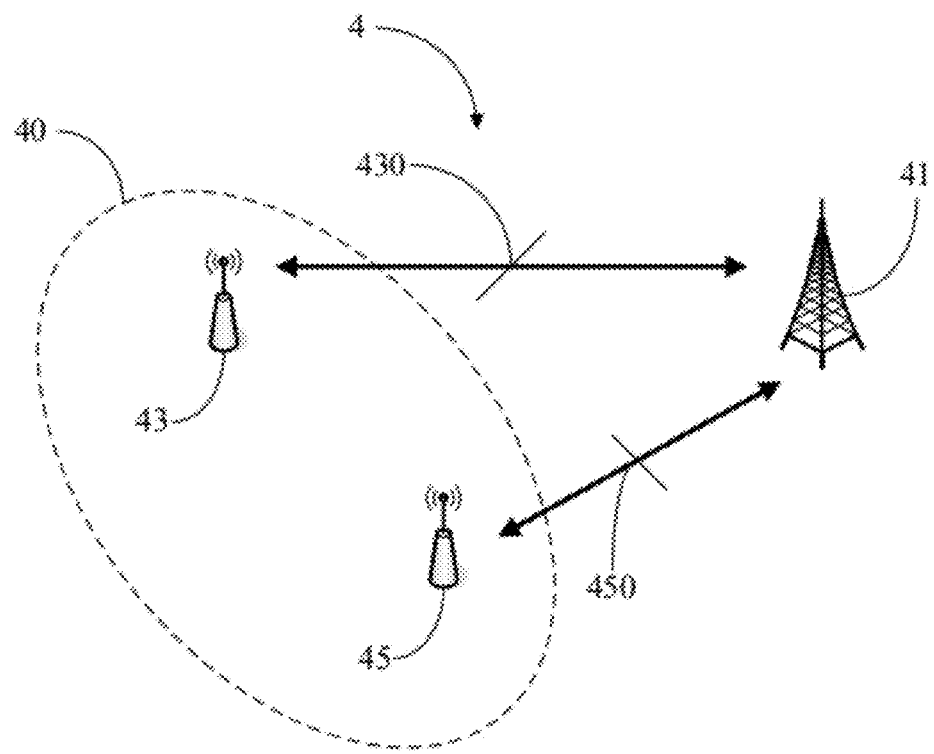
FIG. 4A is a schematic view of a wireless network according to a fourth embodiment of the present invention.
Figure 4B:
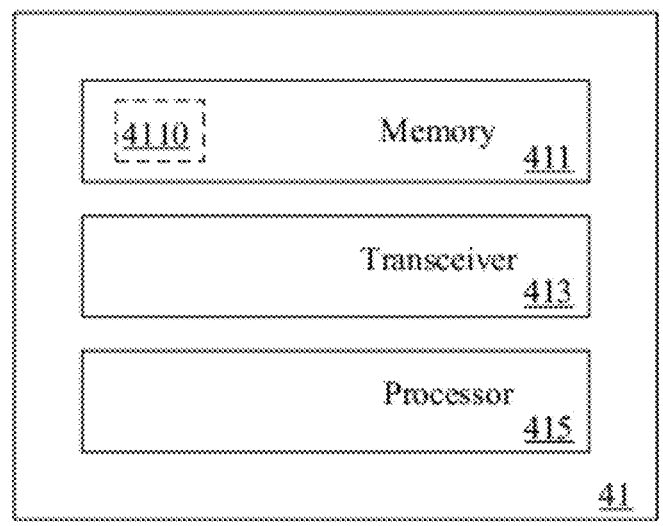
FIG. 4B is a schematic view of a cooperative apparatus according to the fourth embodiment of the present invention.

Furthermore, as signal interferences between femtocells are in reverse proportion to distances therebetween, the grouping described above may also be based on locations of the femtocells. Please refer to FIG. 4A and FIG. 4B together. FIG. 4A is a schematic view of a wireless network 4 according to a fourth embodiment of the present invention. The wireless network 4 comprises a cooperative apparatus 41 and a plurality of femtocells. Likewise, only a first femtocell 43 and a second femtocell 45 are illustrated in the fourth embodiment for purpose of describing the main concepts of the present invention clearly; however, this is not intended to limit the number of femtocells. FIG. 4B is a schematic view of the cooperative apparatus 41 according to the fourth embodiment of the present invention. The cooperative apparatus 41 comprises a memory 111 storing a signal interference threshold 4110, a transceiver 413 and a processor 415. Interactions between the network components will be further described hereinbelow.

Initially, the first femtocell 43 and the second femtocell 45 are positioned by means of their own GPS devices, and the coordinates obtained through positioning are transmitted to the cooperative apparatus 41 respectively. In other words, the transceiver 413 of the cooperative apparatus 41 receives a first femtocell GPS coordinate 430 from the first femtocell 43 and a second femtocell GPS coordinate 450 from the second femtocell 450 respectively, and stores the first femtocell GPS coordinate 430 and the second femtocell GPS coordinate 450 into the memory 411. Because the interference level is usually in reverse proportion to a corresponding distance, the processor 415 of the cooperative apparatus 41 can determine a distance between the two femtocells according to the first femtocell GPS coordinate 430 and the second femtocell GPS coordinate 450, and further estimate a first signal interference value (not shown) between the first femtocell 43 and the second femtocell 45.

Subsequently, the processor 415 of the cooperative apparatus 41 determines whether the first signal interference value exceeds the signal interference threshold 4110. Likewise, if the signal interference value does not exceed the signal interference threshold 4110, it means that the interference is still within the tolerable range; conversely, if the signal interference value exceeds the signal interference threshold 1410, then it means that the signal interference is serious and must be removed. However, the fourth embodiment focuses on the case where the first interference value exceeds the signal interference threshold 1410; in other words, the fourth embodiment focuses on the case where excessively high interferences exist between the first femtocell 43 and the second femtocell 45.

Then, because the processor 415 of the cooperative apparatus 41 determines that the first signal interference value exceeds the signal interference threshold 4110, the processor 415 of the cooperative apparatus 41 can assign the first femtocell 43 and the second femtocell 45 into a first femtocell group 40 according to this determination result and averagely allocates a first resource block to femtocells (i.e., the first femtocell 43 and the second femtocell 45) of the first femtocell group 40. In this way, femtocells that are close to each other (which means that they might interfere with each other to a great extent) in the wireless network are grouped into a same femtocell group so that the cooperative apparatus 41 can allocate resource blocks to femtocells in units of groups.

Figure 5:
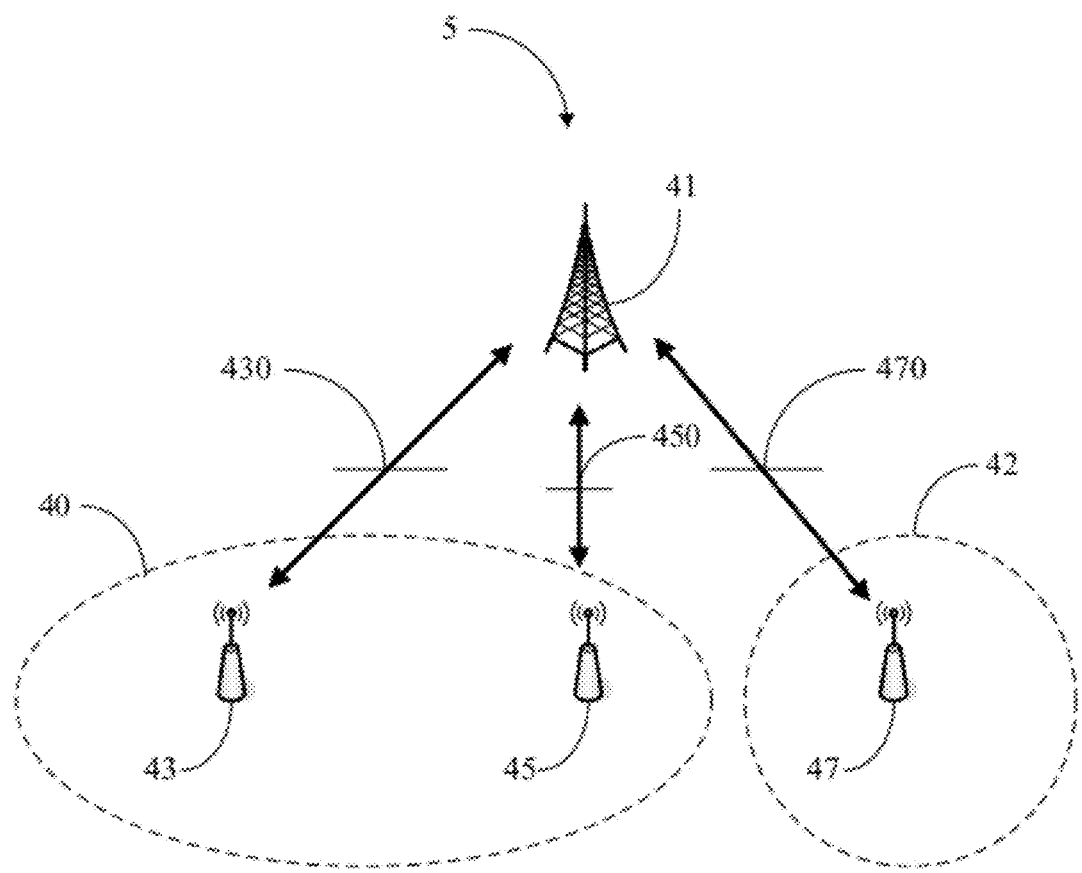
FIG. 5 is a schematic view of a wireless network according to a fifth embodiment of the present invention.

Similarly, according to the grouping concept of the first embodiment, femtocells in the wireless network may be grouped into different femtocell groups, with femtocells in a same group interfering with each other to a great extent and femtocells in different femtocell groups interfering with each other to a small extent. Referring to FIG. 5, there is shown a schematic view of a wireless network 5 according to a fifth embodiment of the present invention. It shall be particularly appreciated that, the hardware structure and network connection environments of the fifth embodiment are similar to those of the fourth embodiment, so no further description will be made thereon again. The fifth embodiment differs from the fourth embodiment in that, the wireless network 5 of the fifth embodiment further comprises a third femtocell 47.

Similar to the fourth embodiment, locations of the third femtocell 47 must be firstly determined. In particular, the third femtocell 47 is positioned by means of its own GPS device, and a coordinate obtained through positioning is transmitted to the cooperative apparatus 41. In other words, the transceiver 413 of the cooperative apparatus 41 receives a third femtocell GPS coordinate 470 from the third femtocell 47 and stores the third femtocell GPS coordinate 470 into the memory 411. Likewise, as the interference level is usually in reverse proportion to a corresponding distance, the processor 415 of the cooperative apparatus 41 can determine a distance between the first femtocell 43 and the third femtocell 47 according to the first femtocell GPS coordinate 430 and the third femtocell GPS coordinate 470, and determine a distance between the second femtocell 45 and the third femtocell 47 according to the second femtocell GPS coordinate 450 and the third femtocell GPS coordinate 470. Next, the processor 415 of the cooperative apparatus 41 further estimates second signal interference values between the first femtocell 43 and the third femtocell 47 and between the second femtocell 45 and the third femtocell 47.

Afterwards, the processor 415 of the cooperative apparatus 41 determines whether any of the second signal interference values exceeds the signal interference threshold 4110. Similarly, if none of the second signal interference values exceeds the signal interference threshold 4110, it means that these interferences are still within the tolerable range; conversely, if any of the second signal interference values exceeds the signal interference threshold 4110, it means that the interference is serious and must be removed. However, the fifth embodiment focuses on the case where none of the second interference values exceeds the signal interference threshold 4110; in other words, the fifth embodiment focuses on the case where the interferences between the third femtocell 47 and the first and the second femtocells 43 and 45 are all within the tolerable range.

Similarly, because femtocells of different femtocell groups interfere with each other to a small extent, resources may be allocated in a random manner; and because femtocells of a same group interfere with each other to a great extent, resources may be allocated averagely. Specifically, in the fifth embodiment, the processor 415 of the cooperative apparatus 41 allocates a first resource block and a second resource block to the first femtocell group 40 and the second femtocell group 42 respectively in a random manner. Then, the cooperative apparatus 41 allocates the first resource block to the femtocells of the first femtocell group 40 averagely, and allocates the second resource block to the femtocells of the second femtocell group 42 also averagely. Thereby, the resource blocks can be allocated to the femtocells in the wireless network more efficiently, and collisions caused by interferences can be reduced.

From the above descriptions, it can be clearly known that the primary concept of the present invention is to group the femtocells according to interference levels thereof; however, the aforesaid embodiments are not intended to limit the number of femtocells of the wireless network. Hereinbelow, a universal network environment for the present invention will be explained with reference to a more generic embodiment.

Figure 6A:
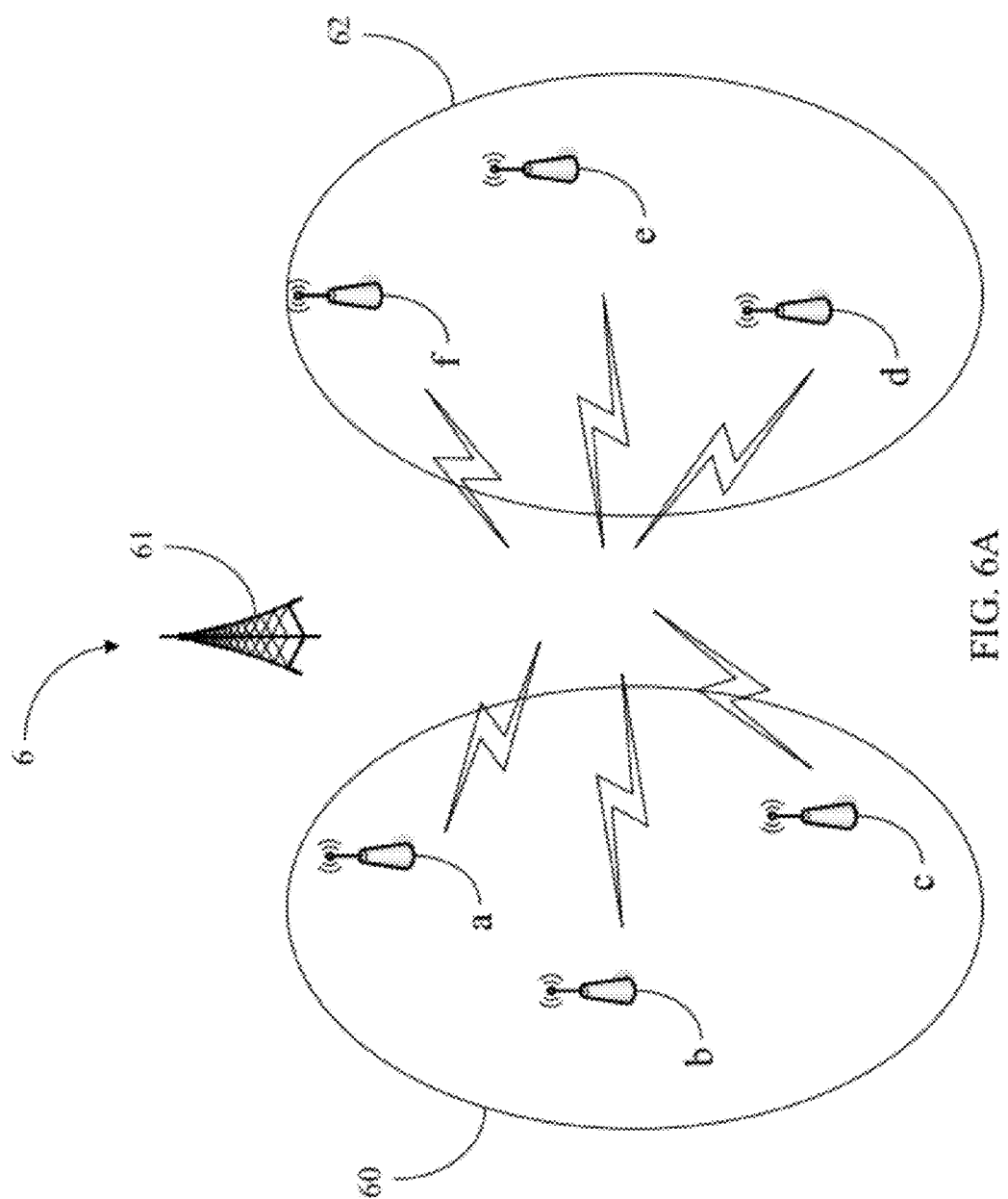
FIG. 6A is a schematic view of a wireless network according to a sixth embodiment of the present invention.
Figures 6B, 6C:
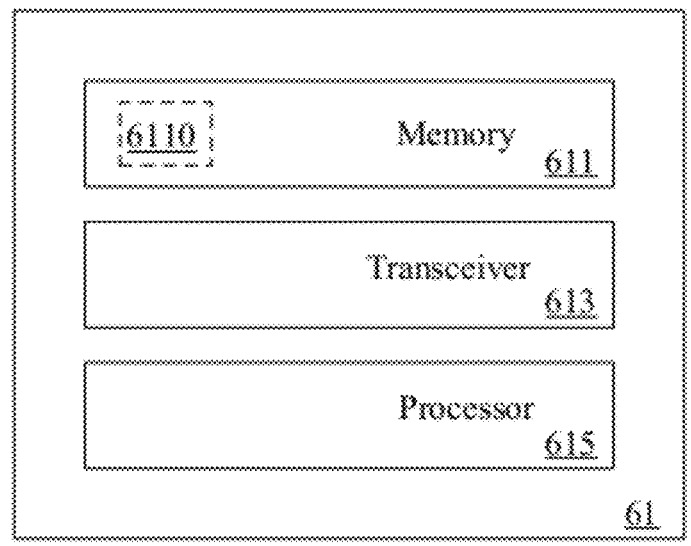
FIG. 6B is a schematic view of a cooperative apparatus according to the sixth embodiment of the present invention.
FIG. 6C is a schematic view illustrating how interference values are recorded in the cooperative apparatus according to the sixth embodiment of the present invention.

Please refer to FIG. 6A and FIG. 6B together. FIG. 6A is a schematic view of a wireless network 6 according to a sixth embodiment of the present invention. The wireless network 6 comprises a cooperative apparatus 61 and a plurality of femtocells a~f. FIG. 6B is a schematic view of the cooperative apparatus 61 according to the sixth embodiment of the present invention. The cooperative apparatus 61 comprises a memory 611 storing a signal interference threshold 6110, a transceiver 613 and a processor 615. Interactions between the network components will be further described hereinbelow.

Firstly, each of the femtocells must receive reference signal received powers of other femtocells in the wireless network so as to learn the signal interference statuses between the femtocells. Specifically, in the sixth embodiment, each of the femtocells a~f transmits a respective reference signal received power to the wireless network 6; and upon receiving the reference signal received power, other femtocells can determine interference values between themselves and the femtocell that transmits the reference signal received power. For example, after the femtocell a transmits a reference signal received power, the femtocell b can determine and record an interference value between the femtocell b and the femtocell a; and similarly, each of the femtocells c~f can also determine and record an interference value between itself and the femtocell a respectively. After having determined and recorded the interference values, the femtocells a~f transmit the recorded interference values to the cooperative apparatus 61 respectively so that the grouping operation can be carried out by the cooperative apparatus 61.

Referring to FIG. 6C together, there is shown a schematic view illustrating how interference values are recorded in the cooperative apparatus 61 according to the sixth embodiment of the present invention. In detail, the cooperative apparatus 61 may store the interference values received from the femtocells into the memory 611 in the form of a matrix shown in FIG. 6C. Further speaking, taking the first row of the matrix shown in FIG. 6C as an example, it represents interference values (in units of dBm) that are determined by the femtocell a according to reference signal received powers transmitted by the femtocells b~f. It shall be particularly appreciated that, because any two femtocells determine interference values independently according to reference signal received powers transmitted by each other, it is possible that the interference values obtained by the two femtocells are not identical as shown in the matrix; in other words, this matrix needs not to be a symmetric matrix.

Next, the processor 615 of the cooperative apparatus 61 determines which interference value(s) exceeds the signal interference threshold 6110 according to the content of the matrix. In detail, the signal interference threshold 6110 is preset to be −30 dBm in the sixth embodiment. Correspondingly, the processor 615 of the cooperative apparatus 61 can determine that the interference value of −29 dBm from the femtocell a to the femtocell b and the interference value −28 dBm from the femtocell a to the femtocell b are greater than the signal interference threshold 6110, which means that the femtocell a and the femtocell b interfere with each other to a great extent. Similarly, the processor 615 of the cooperative apparatus 61 can determine that the femtocells a, b and c interfere with each other to a great extent and the femtocells d, e and f interfere with each other to a great extent according to the content of the matrix.

On the other hand, the processor 615 of the cooperative apparatus 61 can determine that the interference value of −35 dBm from the femtocell d to the femtocell a and the interference value of −34 dBm from the femtocell a to the femtocell d are both smaller than the signal interference value 6110, which means that the femtocell a and the femtocell d interfere with each other to a small extent. Similarly, the processor 615 of the cooperative apparatus 61 can determine that the femtocells a, b, c and the femtocells d, e, f interfere with each other to a small extent according to the content of the matrix. Thus, the processor 615 of the cooperative apparatus 61 can readily group the femtocells a~f into a first femtocell group 60 (comprising the femtocells a~c) and a second femtocell group 62 (comprising femtocells d~f) according to the content of the matrix.

Then, because femtocells of different femtocell groups interfere with each other to a small extent, resources may be allocated in a random manner; and because femtocells of a same group interfere with each other to a great extent, resources may be allocated averagely. Specifically, in the sixth embodiment, the processor 615 of the cooperative apparatus 61 allocates a first resource block and a second resource block to the first femtocell group 60 and the second femtocell group 62 respectively in a random manner. Then, the cooperative apparatus 61 allocates the first resource block to the femtocells of the first femtocell group 60 averagely, and allocates the second resource block to the femtocells of the second femtocell group 62 also averagely. Thereby, the resource blocks can be allocated to the femtocells in the wireless network more efficiently, and collisions caused by interferences can be reduced.

Figure 7:
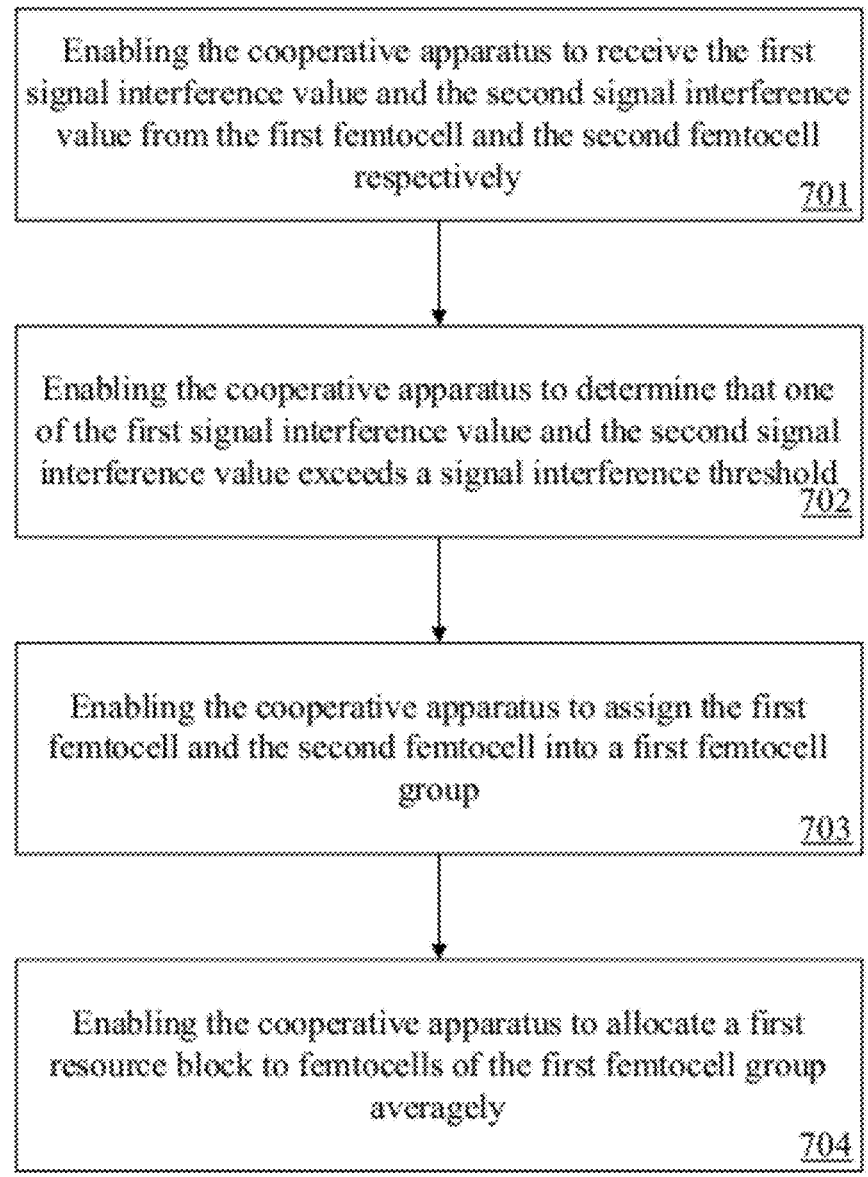
FIG. 7 is a flowchart diagram of a resource block allocation method according to a seventh embodiment of the present invention.

A seventh embodiment of the present invention is a resource block allocation method, a flowchart diagram of which is shown in FIG. 7. The resource block allocation method of the seventh embodiment is for use in a cooperative apparatus (e.g., the cooperative apparatus described in the previous embodiments). The cooperative apparatus is for use in a wireless network. The wireless network comprises a plurality of femtocells including a first femtocell and a second femtocell. The first femtocell records a first signal interference value between the first femtocell and the second femtocell according to a reference signal received power transmitted by the second femtocell, and the second femtocell records a second signal interference value between the second femtocell and the first femtocell according to a reference signal received power transmitted by the first femtocell. Steps of the resource block allocation method of the seventh embodiment will be detailed as follows.

Firstly, step 701 is executed to enable the cooperative apparatus to receive the first signal interference value and the second signal interference value from the first femtocell and the second femtocell respectively. Step 702 is executed to enable the cooperative apparatus to determine that one of the first signal interference value and the second signal interference value exceeds a signal interference threshold. In other words, it means that the first femtocell and the second femtocell interfere with each other to a great extent. Then, step 703 is executed to enable the cooperative apparatus to assign the first femtocell and the second femtocell into a first femtocell group according to the result of the step 702. Finally, step 704 is executed to enable the cooperative apparatus to allocate a first resource block to femtocells of the first femtocell group averagely. In this way, the resource block can be averagely allocated to femtocells of the same group that interfere with each other to a great extent.

Figure 8:
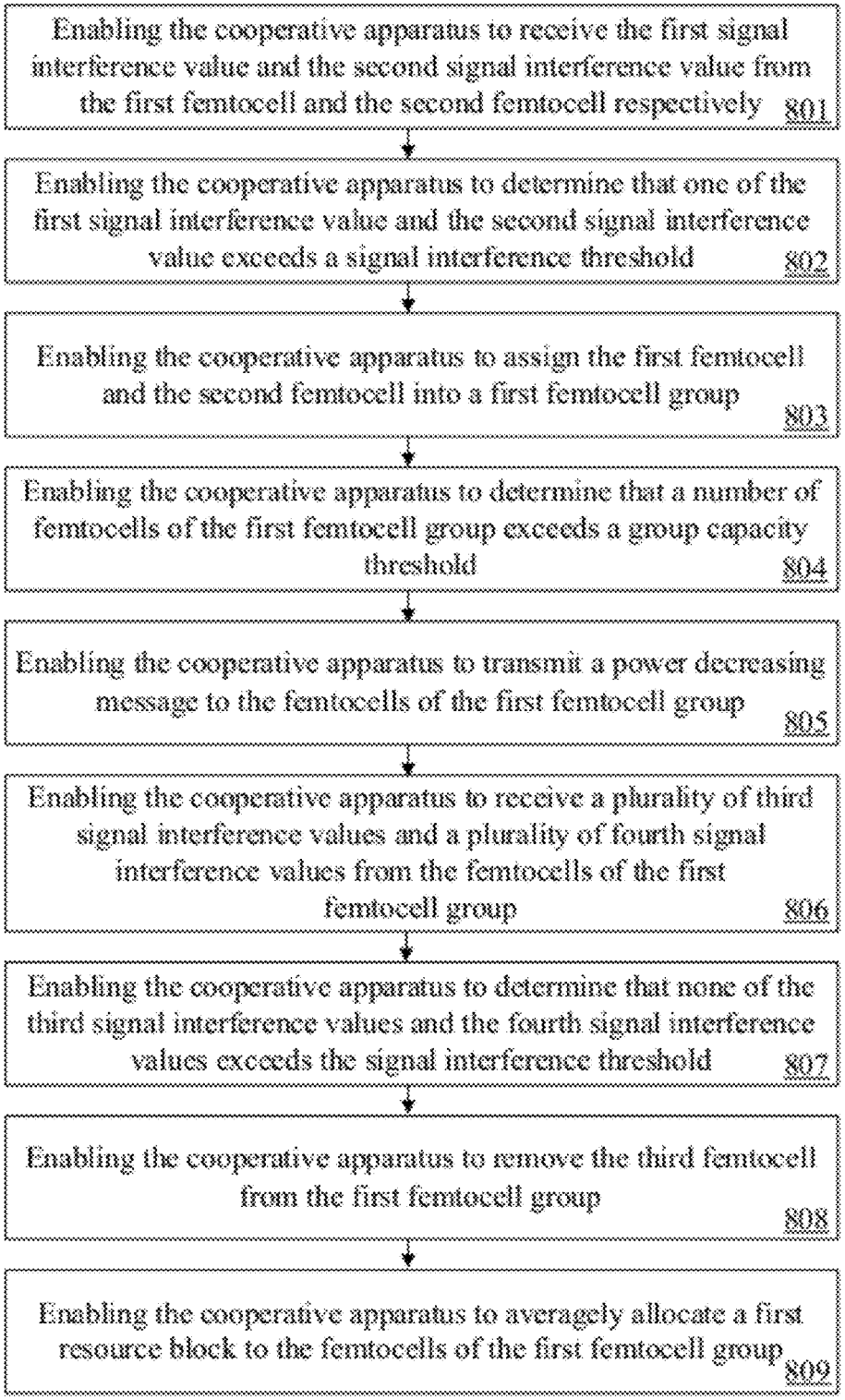
FIG. 8 is a flowchart diagram of a resource block allocation method according to an eighth embodiment of the present invention.

An eighth embodiment of the present invention is a resource block allocation method, a flowchart of which is shown in FIG. 8. The resource block allocation method of the eighth embodiment is for use in a cooperative apparatus (e.g., the cooperative apparatus described in the previous embodiments). The cooperative apparatus is for use in a wireless network. The wireless network comprises a plurality of femtocells including a first femtocell and a second femtocell. The first femtocell records a first signal interference value between the first femtocell and the second femtocell according to a reference signal received power transmitted by the second femtocell, and the second femtocell records a second signal interference value between the second femtocell and the first femtocell according to a reference signal received power transmitted by the first femtocell. Steps of the resource block allocation method of the eighth embodiment will be detailed as follows.

Firstly, step 801 is executed to enable the cooperative apparatus to receive the first signal interference value and the second signal interference value from the first femtocell and the second femtocell respectively. Step 802 is executed to enable the cooperative apparatus to determine that one of the first signal interference value and the second signal interference value exceeds a signal interference threshold. In other words, it means that the first femtocell and the second femtocell interfere with each other to a great extent. Then, step 803 is executed to enable the cooperative apparatus to assign the first femtocell and the second femtocell into a first femtocell group according to the result of the step 802. It shall be particularly appreciated that, the first femtocell group in the eighth embodiment further comprises a third femtocell.

Then, step 804 is executed to enable the cooperative apparatus to determine that a number of femtocells of the first femtocell group exceeds a group capacity threshold. Step 805 is executed to enable the cooperative apparatus to transmit a power decreasing message to the femtocells of the first femtocell group so that the femtocells of the first femtocell group decrease the respective signal transmission power in response to the power decreasing message. Then, step 806 is executed to enable the cooperative apparatus to receive a plurality of third signal interference values and a plurality of fourth signal interference values from the femtocells of the first femtocell group after the step 805. The third signal interference values are recorded by the third femtocell according to reference signal received powers transmitted by the femtocells of the first femtocell group respectively, and the fourth signal interference values are recorded by the femtocells of the first femtocell group respectively according to a reference signal received power transmitted by the third femtocell.

Step 807 is executed to enable the cooperative apparatus to determine that none of the third signal interference values and the fourth signal interference values exceeds the signal interference threshold. In other words, the interferences between the third femtocell and the other femtocells of the first femtocell group are all within a tolerable range after the third femtocell decreases the power. Subsequently, step 808 is executed to enable the cooperative apparatus to remove the third femtocell from the first femtocell group according to the result of the step 807. Finally, step 809 is executed to enable the cooperative apparatus to averagely allocate a first resource block to the femtocells of the first femtocell group. Thus, with the arrangement of the eighth embodiment, the number of femtocells in a group can be controlled to be within a specific value so that the resource block can be allocated more efficiently within the group.

A ninth embodiment of the present invention is a resource block allocation method, a flowchart of which is shown in FIG. 9. The resource block allocation method of the ninth embodiment is for use in a cooperative apparatus (e.g., the cooperative apparatus described in the previous embodiments). The cooperative apparatus is for use in a wireless network. The wireless network comprises a plurality of femtocells including a first femtocell, a second femtocell and a third femtocell. The first femtocell records a first signal interference value between the first femtocell and the second femtocell according to a reference signal received power transmitted by the second femtocell. The second femtocell records a second signal interference value between the second femtocell and the first femtocell according to a reference signal received power transmitted by the first femtocell. The third femtocell records a plurality of third signal interference values between the third femtocell and the femtocells of the first femtocell group according to the reference signal received powers transmitted by the femtocells of the first femtocell group respectively, and the femtocells of the first femtocell group record a plurality of fourth signal interference values between the femtocells of the first femtocell group and the third femtocell respectively according to a reference signal received power transmitted by the third femtocell. Steps of the resource block allocation method of the ninth embodiment will be detailed as follows.

Firstly, step 901 is executed to enable the cooperative apparatus to receive the first signal interference value and the second signal interference value from the first femtocell and the second femtocell respectively. Step 902 is executed to enable the cooperative apparatus to determine that one of the first signal interference value and the second signal interference value exceeds a signal interference threshold. In other words, it means that the first femtocell and the second femtocell interfere with each other to a great extent. Then, step 903 is executed to enable the cooperative apparatus to assign the first femtocell and the second femtocell into a first femtocell group according to the result of the step 902. Step 904 is executed to enable the cooperative apparatus to receive the third signal interference values and the fourth signal interference values from the third femtocell and the femtocells of the first femtocell group respectively.

Thereafter, step 905 is executed to enable the cooperative apparatus to determine that none of the third signal interference values and the fourth signal interference values exceeds the signal interference threshold, and step 906 is executed to enable the cooperative apparatus to assign the third femtocell into a second femtocell group according to the result of the step 905.

Next, step 907 is executed to enable the cooperative apparatus to randomly allocate a first resource block and a second resource block to the first femtocell group and the second femtocell group respectively. Finally, step 908 is executed to enable the cooperative apparatus to averagely allocate the first resource block to the femtocells of the first femtocell group and averagely allocate the second resource block to femtocells of the second femtocell group. Accordingly, because different groups of femtocells interfere with each other to a small extent, even allocating the resource blocks to different groups of femtocells randomly will not readily cause interference collisions; and because femtocells of a same group interfere with each other to a great extent, allocating a resource block to the femtocells averagely can reduce the possibility of interference collisions. Thereby, the resource blocks can be allocated to the femtocells in the wireless network more efficiently.

Figure 10:
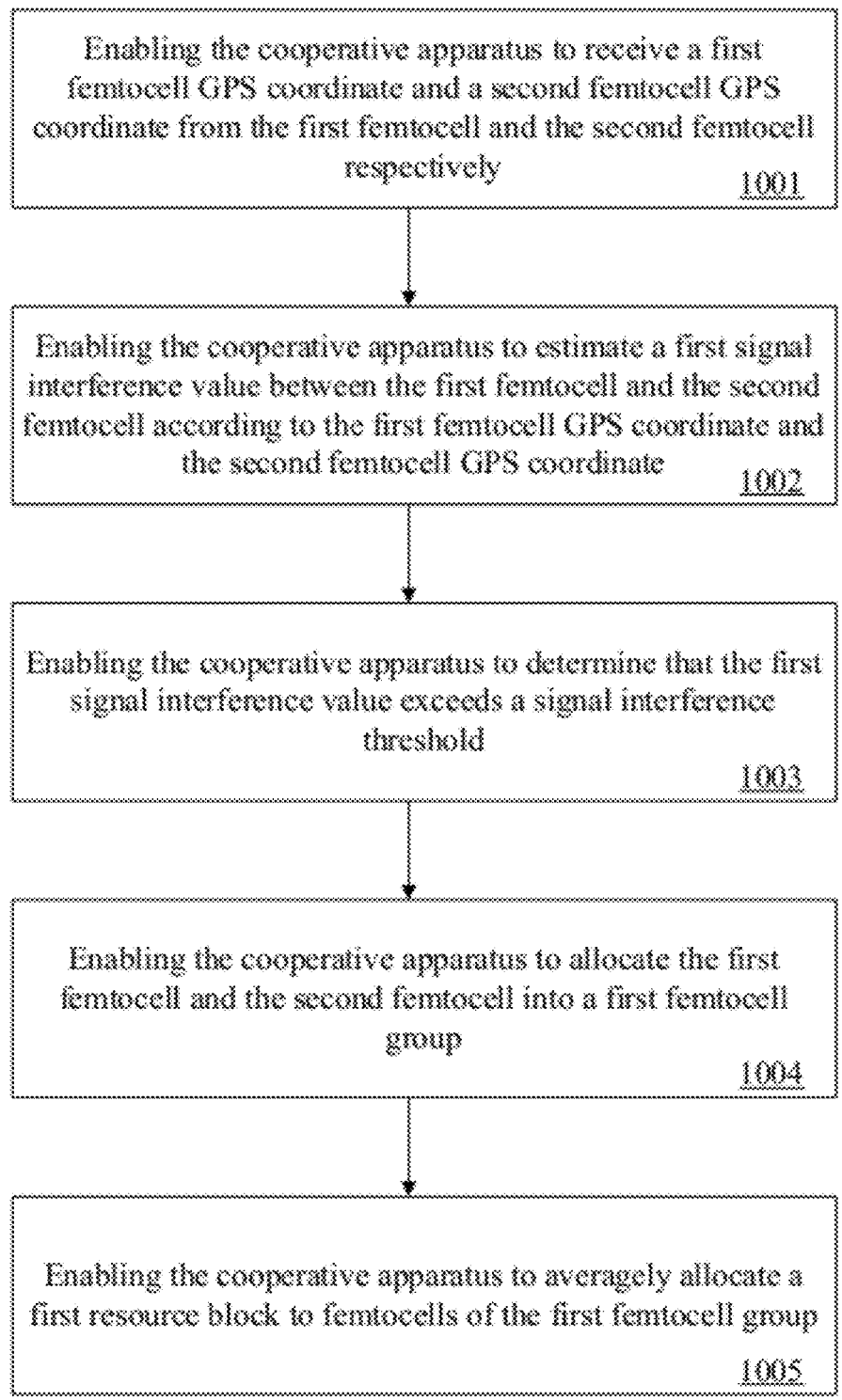
FIG. 10 is a flowchart diagram of a resource block allocation method according to a tenth embodiment of the present invention.

A tenth embodiment of the present invention is a resource block allocation method, a flowchart of which is shown in FIG. 10. The resource block allocation method of the tenth embodiment is for use in a cooperative apparatus (e.g., the cooperative apparatus described in the previous embodiments). The cooperative apparatus is for use in a wireless network. The wireless network comprises a plurality of femtocells including a first femtocell and a second femtocell. Steps of the resource block allocation method of the tenth embodiment will be detailed as follows.

Firstly, step 1001 is executed to enable the cooperative apparatus to receive a first femtocell global positioning system (GPS) coordinate and a second femtocell GPS coordinate from the first femtocell and the second femtocell respectively. Because the interference level is substantially in reverse proportion to the corresponding distance, step 1002 is executed to enable the cooperative apparatus to estimate a first signal interference value between the first femtocell and the second femtocell according to the first femtocell GPS coordinate and the second femtocell GPS coordinate. Then, step 1003 is executed to enable the cooperative apparatus to determine that the first signal interference value exceeds a signal interference threshold; in other words, this means that the first femtocell and the second femtocell interfere with each other to a great extent.

Next, step 1004 is executed to enable the cooperative apparatus to allocate the first femtocell and the second femtocell into a first femtocell group according to the result of the step 1003. Finally, step 1005 is executed to enable the cooperative apparatus to averagely allocate a first resource block to femtocells of the first femtocell group. In this way, femtocells that are close to each other (which means that they interfere with each other to a great extent) are grouped into a same femtocell group and can be allocated resources averagely.

Figure 11:
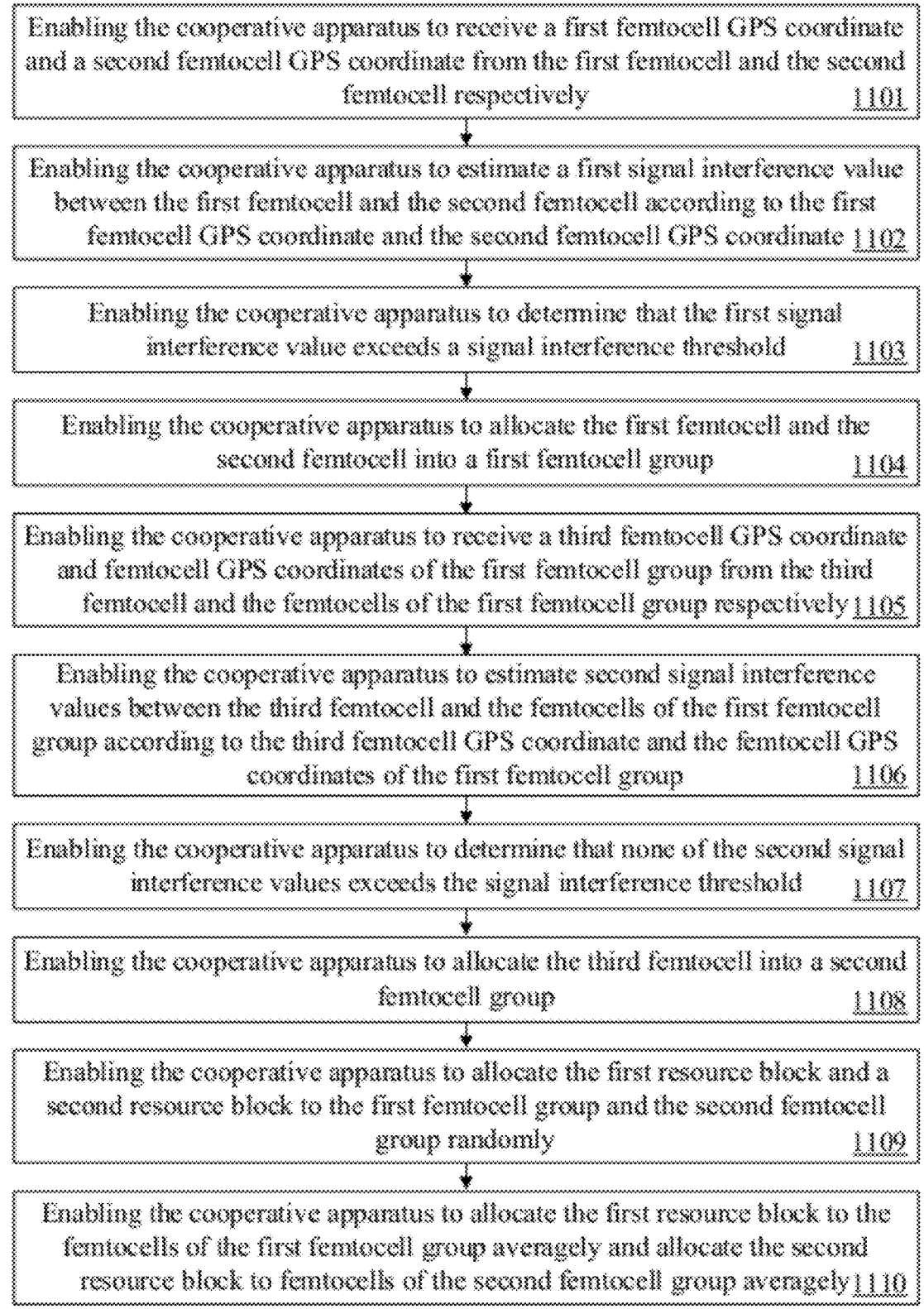
FIG. 11 is a flowchart diagram of a resource block allocation method according to an eleventh embodiment of the present invention.

An eleventh embodiment of the present invention is a resource block allocation method, a flowchart of which is shown in FIG. 11. The resource block allocation method of the eleventh embodiment is for use in a cooperative apparatus (e.g., the cooperative apparatus described in the previous embodiments). The cooperative apparatus is for use in a wireless network. The wireless network comprises a plurality of femtocells including a first femtocell, a second femtocell and a third femtocell. Steps of the resource block allocation method of the eleventh embodiment will be detailed as follows.

Firstly, step 1101 is executed to enable the cooperative apparatus to receive a first femtocell GPS coordinate and a second femtocell GPS coordinate from the first femtocell and the second femtocell respectively. Because the interference level is substantially in reverse proportion to the corresponding distance, step 1102 is executed to enable the cooperative apparatus to estimate a first signal interference value between the first femtocell and the second femtocell according to the first femtocell GPS coordinate and the second femtocell GPS coordinate. Then, step 1103 is executed to enable the cooperative apparatus to determine that the first signal interference value exceeds a signal interference threshold; in other words, this means that the first femtocell and the second femtocell interfere with each other to a great extent.

Next, step 1104 is executed to enable the cooperative apparatus to allocate the first femtocell and the second femtocell into a first femtocell group according to the result of the step 1103. Step 1105 is executed to enable the cooperative apparatus to receive a third femtocell GPS coordinate and femtocell GPS coordinates of the first femtocell group from the third femtocell and the femtocells of the first femtocell group respectively. Subsequently, step 1106 is executed to enable the cooperative apparatus to estimate second signal interference values between the third femtocell and the femtocells of the first femtocell group according to the third femtocell GPS coordinate and the femtocell GPS coordinates of the first femtocell group. Step 1107 is executed to enable the cooperative apparatus to determine that none of the second signal interference values exceeds the signal interference threshold. In other words, the third femtocell is far away from the femtocells of the first femtocell group, which means that the third femtocell and the femtocells of the first femtocell group interfere with each other to a small extent.

Next, step 1108 is executed to enable the cooperative apparatus to allocate the third femtocell into a second femtocell group according to the result of the step 1107. Step 1109 is executed to enable the cooperative apparatus to allocate the first resource block and a second resource block to the first femtocell group and the second femtocell group randomly. Finally, step 1110 is executed to enable the cooperative apparatus to allocate the first resource block to the femtocells of the first femtocell group averagely and allocate the second resource block to femtocells of the second femtocell group averagely. In this way, femtocells that are close to each other (which means that they interfere with each other to a great extent) are grouped into a same femtocell group, while femtocells far from each other (which means that they interfere with each other to a small extent) are grouped into different groups. Because different groups of femtocells interfere with each other to a small extent, even allocating the resource blocks to different groups of femtocells in a random manner will not readily cause interference collisions; and because femtocells of a same group interfere with each other to a great extent, allocating a resource block to the femtocells averagely can reduce the possibility of interference collisions. Thereby, the resource blocks can be allocated to the femtocells in the wireless network more efficiently.

According to the above descriptions, the cooperative apparatus and the resource block allocation method of the present invention can firstly assign femtocells into different groups according to interference levels therebetween. Then, because different groups of femtocells interfere with each other to a small extent, even allocating the resource blocks to different groups of femtocells in a random manner will not readily cause interference collisions; and because femtocells of a same group interfere with each other to a great extent, allocating a resource block to the femtocells averagely can reduce the possibility of interference collisions. Thereby, the resource blocks can be allocated to the femtocells in the wireless network more efficiently.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A resource block allocation method for a cooperative apparatus, the cooperative apparatus being used in a wireless network, the wireless network comprising a plurality of femtocells which include a first femtocell and a second femtocell, the first femtocell recording a first signal interference value between the first femtocell and the second femtocell according to a reference signal received power transmitted by the second femtocell, and the second femtocell recording a second signal interference value between the second femtocell and the first femtocell according to a reference signal received power transmitted by the first femtocell, the resource block allocation method comprising the steps of:
   (a) enabling the cooperative apparatus to receive the first signal interference value and the second signal interference value from the first femtocell and the second femtocell respectively;
   (b) enabling the cooperative apparatus to determine that one of the first signal interference value and the second signal interference value exceeds a signal interference threshold;
   (c) enabling the cooperative apparatus to assign the first femtocell and the second femtocell into a first femtocell group according to a result of the step (b); and
   (d) enabling the cooperative apparatus to allocate a first resource block to femtocells of the first femtocell group averagely.

2. The resource block allocation method as claimed in claim 1, wherein the first femtocell group further comprises a third femtocell, and the resource block allocation method further comprises the following steps after the step (c):
   (e) enabling the cooperative apparatus to determine that a number of femtocells of the first femtocell group exceeds a group capacity threshold;
   (f) enabling the cooperative apparatus to transmit a power decreasing message to the femtocells of the first femtocell group so that the femtocells of the first femtocell group decrease the transmitting power in response to the power decreasing message;
   (g) enabling the cooperative apparatus to receive a plurality of third signal interference values and a plurality of fourth signal interference values from the femtocells of the first femtocell group after the step (f), wherein the third signal interference values are recorded by the third femtocell according to reference signal received powers transmitted by the femtocells of the first femtocell group respectively, and the fourth signal interference values are recorded by the femtocells of the first femtocell group respectively according to a reference signal received power transmitted by the third femtocell;
   (h) enabling the cooperative apparatus to determine that none of the third signal interference values and the fourth signal interference values exceeds the signal interference threshold; and
   (i) enabling the cooperative apparatus to remove the third femtocell from the first femtocell group according to a result of the step (h).

3. The resource block allocation method as claimed in claim 1, wherein the femtocells further include a third femtocell, the third femtocell records a plurality of third signal interference values between the third femtocell and the femtocells of the first femtocell group according to the reference signal received powers transmitted by the femtocells of the first femtocell group respectively, and the femtocells of the first femtocell group record a plurality of fourth signal interference values between the femtocells of the first femtocell group and the third femtocell respectively according to a reference signal received power transmitted by the third femtocell, and the resource block allocation method further comprises the steps of:

(e) enabling the cooperative apparatus to receive the third signal interference values and the fourth signal interference values from the third femtocell and the femtocells of the first femtocell group respectively;

(f) enabling the cooperative apparatus to determine that none of the third signal interference values and the fourth signal interference values exceeds the signal interference threshold; and (g) enabling the cooperative apparatus to assign the third femtocell into a second femtocell group according to a result of the step (f).

4. The resource block allocation method as claimed in claim 3, wherein the step (d) further comprises the steps of:

(d1) enabling the cooperative apparatus to randomly allocate the first resource block and a second resource block to the first femtocell group and the second femtocell group respectively; and (d2) enabling the cooperative apparatus to averagely allocate the first resource block to the femtocells of the first femtocell group and averagely allocate the second resource block to femtocells of the second femtocell group.

5. A resource block allocation method for a cooperative apparatus, the cooperative apparatus being used in a wireless network, and the wireless network comprising a plurality of femtocells which include a first femtocell and a second femtocell, the resource block allocation method comprising the steps of:

(a) enabling the cooperative apparatus to receive a first femtocell global positioning system (GPS) coordinate and a second femtocell GPS coordinate from the first femtocell and the second femtocell respectively;

(b) enabling the cooperative apparatus to estimate a first signal interference value between the first femtocell and the second femtocell according to the first femtocell GPS coordinate and the second femtocell GPS coordinate;

(c) enabling the cooperative apparatus to determine that the first signal interference value exceeds a signal interference threshold;

(d) enabling the cooperative apparatus to assign the first femtocell and the second femtocell into a first femtocell group according to a result of the step (c); and (e) enabling the cooperative apparatus to averagely allocate a first resource block to femtocells of the first femtocell group.

6. The resource block allocation method as claimed in claim 5, wherein the first femtocell group further comprises a third femtocell, and the resource block allocation method further comprises the following steps after the step (d):

(f) enabling the cooperative apparatus to receive a third femtocell GPS coordinate and femtocell GPS coordinates of the first femtocell group from the third femtocell and the femtocells of the first femtocell group respectively;

(g) enabling the cooperative apparatus to estimate second signal interference values between the third femtocell and the femtocells of the first femtocell group according to the third femtocell GPS coordinate and the femtocell GPS coordinates of the first femtocell group;

(h) enabling the cooperative apparatus to determine that none of the second signal interference values exceeds the signal interference threshold; and (i) enabling the cooperative apparatus to assign the third femtocell into a second femtocell group according to a result of the step (h).

7. The resource block allocation method as claimed in claim 6, wherein the step (e) further comprises the steps of:

(e1) enabling the cooperative apparatus to allocate the first resource block and a second resource block to the first femtocell group and the second femtocell group randomly; and (e2) enabling the cooperative apparatus to averagely allocate the first resource block to the femtocells of the first femtocell group and averagely allocate the second resource block to femtocells of the second femtocell group.

8. A cooperative apparatus for use in a wireless network, the wireless network comprising a plurality of femtocells which include a first femtocell and a second femtocell, the first femtocell recording a first signal interference value between the first femtocell and the second femtocell according to a reference signal received power transmitted by the second femtocell, and the second femtocell recording a second signal interference value between the second femtocell and the first femtocell according to a reference signal received power transmitted by the first femtocell, the cooperative apparatus comprising:

a memory, being configured to store a signal interference threshold;

a transceiver; and a processor, wherein the transceiver is configured to receive the first signal interference value and the second signal interference value from the first femtocell and the second femtocell respectively, the memory is configured to store the first signal interference value and the second signal interference value, the processor is configured to determine that one of the first signal interference value and the second signal interference value exceeds the signal interference threshold and to assign the first femtocell and the second femtocell into a first femtocell group, and the processor is further configured to averagely allocate a first resource block to femtocells of the first femtocell group.

9. The cooperative apparatus as claimed in claim 8, wherein the first femtocell group further comprises a third femtocell, the memory is further configured to store a group capacity threshold, the processor is further configured to determine that a number of femtocells in the first femtocell group exceeds the group capacity threshold, the transceiver is further configured to transmit a power decreasing message to the femtocells of the first femtocell group so that the femtocells of the first femtocell group decrease the transmitting power in response to the power decreasing message and to receive a plurality of third signal interference values and a plurality of fourth signal interference values from the femtocells of the first femtocell group, wherein the third signal interference values are recorded by the third femtocell according to reference signal received powers transmitted by the femtocells of the first femtocell group, and the fourth signal interference values are recorded by the femtocells of the first femtocell group according to the reference signal received power transmitted by the third femtocell, the memory is further configured to store the third signal interference values and the fourth signal interference values, and the processor is further configured to determine that none of the third signal interference values and the fourth signal interference values exceeds the signal interference threshold and to remove the third femtocell from the first femtocell group.

10. The cooperative apparatus as claimed in claim 8, wherein the femtocells further include a third femtocell, the third femtocell records a plurality of third signal interference values between the third femtocell and the femtocells of the first femtocell group according to the reference signal received powers transmitted by the femtocells of the first femtocell group, and the femtocells of the first femtocell group record a plurality of fourth signal interference values between the femtocells of the first femtocell group and the third femtocell according to a reference signal received power transmitted by the third femtocell, the transceiver is further configured to receive the third signal interference values and the fourth signal interference values from the third femtocell and the femtocells of the first femtocell group respectively, the memory is further configured to store the third signal interference values and the fourth signal interference values, and the processor is further configured to determine that none of the third signal interference values and the fourth signal interference values exceeds the signal interference threshold and to assign the third femtocell into a second femtocell group.

11. The cooperative apparatus as claimed in claim 10, wherein the processor is further configured to randomly allocate the first resource block and a second resource block to the first femtocell group and the second femtocell group, and to averagely allocate the first resource block to the femtocells of the first femtocell group and averagely allocate the second resource block to femtocells of the second femtocell group.

12. A cooperative apparatus for use in a wireless network, the wireless network comprising a plurality of femtocells which include a first femtocell and a second femtocell, the cooperative apparatus comprising:
a memory, being configured to store a signal interference threshold;
a transceiver; and
a processor,
wherein the transceiver is configured to receive a first femtocell GPS coordinate and a second femtocell GPS coordinate from the first femtocell and the second femtocell respectively, the memory is configured to store the first femtocell GPS coordinate and the second femtocell GPS coordinate, the processor is configured to estimate a first signal interference value between the first femtocell and the second femtocell according to the first femtocell GPS coordinate and the second femtocell GPS coordinate and to determine that the first signal interference value exceeds the signal interference threshold, and the processor is further configured to assign the first femtocell and the second femtocell into a first femtocell group and to averagely allocate a first resource block to femtocells of the first femtocell group.

13. The cooperative apparatus as claimed in claim 12, wherein the transceiver is further configured to receive a third femtocell GPS coordinate and femtocell GPS coordinates of the first femtocell group from a third femtocell and the femtocells of the first femtocell group respectively, the memory is further configured to store the third femtocell GPS coordinate and the femtocell GPS coordinates of the first femtocell group, the processor is further configured to estimate second signal interference values between the third femtocell and the femtocells of the first femtocell group according to the third femtocell GPS coordinate and the femtocell GPS coordinates of the first femtocell group, and the processor is further configured to determine that neither of the second signal interference values exceeds the signal interference threshold and to assign the third femtocell into a second femtocell group.

14. The cooperative apparatus as claimed in claim 13, wherein the processor is further configured to randomly allocate the first resource block and a second resource block to the first femtocell group and the second femtocell group, and to averagely allocate the first resource block to the femtocells of the first femtocell group and averagely allocate the second resource block to femtocells of the second femtocell group.

* * * * *